US009582495B2

(12) United States Patent
Song

(10) Patent No.: US 9,582,495 B2
(45) Date of Patent: Feb. 28, 2017

(54) DOMAIN KNOWLEDGE DRIVEN SEMANTIC EXTRACTION SYSTEM

(71) Applicant: Yuqian Song, Dublin (IE)

(72) Inventor: Yuqian Song, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 207 days.

(21) Appl. No.: 14/307,248

(22) Filed: Jun. 17, 2014

(65) Prior Publication Data

US 2015/0363386 A1    Dec. 17, 2015

(51) Int. Cl.
*G06F 17/27*    (2006.01)
*G06F 17/20*    (2006.01)
*G06F 17/30*    (2006.01)

(52) U.S. Cl.
CPC ..... *G06F 17/2785* (2013.01); *G06F 17/30731* (2013.01)

(58) Field of Classification Search
None
See application file for complete search history.

(56) References Cited

U.S. PATENT DOCUMENTS

| | | | | |
|---|---|---|---|---|
| 6,259,448 B1* | 7/2001 | McNally | ............... | G06F 3/0486 709/201 |
| 6,308,163 B1* | 10/2001 | Du | ........................ | G06Q 10/06 705/7.13 |
| 7,702,655 B1* | 4/2010 | Panelli | ................ | H04L 41/0869 707/600 |
| 8,429,179 B1* | 4/2013 | Mirhaji | ............. | G06F 17/30312 707/756 |
| 2004/0054690 A1* | 3/2004 | Hillerbrand | ............ | G06Q 10/06 |
| 2005/0071305 A1* | 3/2005 | Hugh | .................. | G06F 17/3061 706/45 |
| 2008/0071731 A1* | 3/2008 | Ma | ..................... | G06F 17/30734 |

(Continued)

OTHER PUBLICATIONS

Yuqian Song, John Keeney, and Owen Conlan, "A Framework to Leverage Domain Expertise to Support Novice Users in the Visual Exploration of Home Area Networks," IEEE, 2012, pp. 1-4.

*Primary Examiner* — Marcus T Riley
(74) *Attorney, Agent, or Firm* — Fountainhead Law Group P.C.

(57) ABSTRACT

A semantic extraction system leverages domain expert knowledge, to impart meaningful business information aiding ordinary knowledge consumers in understanding large/complex data volumes and models thereof. Certain embodiments may comprise a layered structure comprising an information uplifting layer, a semantic processing layer, and a visual representation layer. Referencing domain knowledge model(s) created by human domain experts, the information uplifting layer extracts and maintains meaningful information in a semantic structure. The semantic processing layer then processes this extracted information for various different business analysis purposes. Finally, the visual representation layer allows the analyzed and aggregated information to be arranged and visualized via a range of interactive tools. The overall layered structure is powered by the domain knowledge models, which capture specialized knowledge from experts in different domains. Such domains can include industry and enterprise characteristics, data visualization, and model structure and function.

11 Claims, 11 Drawing Sheets

(56) References Cited

U.S. PATENT DOCUMENTS

| | | | |
|---|---|---|---|
| 2013/0246049 A1* | 9/2013 | Mirhaji | G06F 17/30312 704/9 |
| 2013/0268290 A1* | 10/2013 | Jackson | G06F 19/28 705/2 |
| 2013/0275448 A1* | 10/2013 | Mirhaji | G06F 17/30312 707/756 |

* cited by examiner

DOMAIN KNOWLEDGE DRIVEN SEMANTIC EXTRACTION SYSTEM

BACKGROUND

Embodiments relate to manipulation of database data, and in particular, to domain knowledge driven semantic extraction systems.

Unless otherwise indicated herein, the approaches described in this section are not prior art to the claims in this application and are not admitted to be prior art by inclusion in this section.

Modern Business Intelligence (BI) systems combine large amounts of operational data with analytical tools, in order to present complex and competitive information to planners and decision makers. Such BI systems seek to improve timeliness and quality of inputs to the decision-making process, by providing information such as: capabilities available in the enterprise; state of the art; trends; and future market directions; technologies; regulatory environment; and competitor actions and implications of those actions.

Factors such as the emergence of the data warehouse as a repository, advances in data cleansing, increased capabilities of hardware and software, and the evolution of web architecture, have each combined to create an enriched business intelligence environment. However, in the era of "big data", rapid growth of data volume and complexity underscores the importance of precisely acquiring meaningful information from the data.

Specifically, the large volumes of data available from different business domains in heterogeneous structures or metrics, tends to exhibit bewildering complexity beyond the expertise of an average business customer. Such an average business customer would have difficulty in acquiring professional knowledge in different business domains. But, in most cases, assistance from domain experts is expensive or unavailable.

Thus, a fundamental challenge exists in extracting information that fits the insights of domain knowledge, and then delivering that information in a manner useful to an average business customer.

Accordingly, there is a need for domain knowledge driven semantic extraction systems.

SUMMARY

A semantic extraction system leverages domain expert knowledge, to impart meaningful business information aiding ordinary knowledge consumers in understanding large/complex data volumes and models thereof. Certain embodiments may comprise a layered structure comprising an information uplifting layer, a semantic processing layer, and a visual representation layer. Referencing domain knowledge model(s) created by human domain experts, the information uplifting layer extracts meaningful information from low-level to high-level, maintained in a semantic structure. The information describing underlying data is defined as low-level information, and information about business objectives as high-level information. The semantic processing layer then processes this extracted information for various different business analysis purposes. Finally, the visual representation layer allows the analyzed and aggregated information to be arranged and visualized via a range of interactive tools. The overall layered structure is powered by the domain knowledge models, which capture specialized knowledge from experts in different domains. Such domains can include industry and enterprise characteristics, data visualization, and model structure and function.

An embodiment of a computer-implemented method comprises providing an engine in communication with a database configured to store a data type, causing the engine to receive a heterogeneous input comprising an element, and causing the engine to reference a schema of a knowledge model created by a domain expert, to produce a mapping of the element with a class of the mapping schema. The engine is caused to output a resource model comprising the mapping and a relationship between the element and the data type.

A non-transitory computer readable storage medium embodies a computer program for performing a method comprising providing an engine in communication with a database configured to store a data type, causing the engine to receive a heterogeneous input comprising an element, and causing the engine to reference a schema of a knowledge model created by a domain expert, to produce a mapping of the element with a class of the mapping schema. The engine is caused to output a resource model comprising the mapping and a relationship between the element and the data type.

An embodiment of a computer system comprises one or more processors and a software program executable on said computer system and configured to provide an engine in communication with a database configured to store a data type, to cause the engine to receive a heterogeneous input comprising an element, and to cause the engine to reference a schema of a knowledge model created by a domain expert, to produce a mapping of the element with a class of the mapping schema. The engine is caused to output a resource model comprising the mapping and a relationship between the element and the data type.

In certain embodiments the resource model further comprises a written description of the element.

According to some embodiments the schema identifies a format of the data type.

Particular embodiments further comprise causing the engine to consume the resource model to produce a semantic attribute annotation of the element.

Various embodiments further comprise causing the engine to execute a pattern detection algorithm to produce the semantic attribute annotation.

Certain embodiments further comprise causing the engine to perform decision support referencing a semantic entity annotation derived from the semantic attribute annotation.

In particular embodiments the class is encoded in web ontology language (OWL).

The following detailed description and accompanying drawings provide a better understanding of the nature and advantages of embodiments.

DETAILED DESCRIPTION

Described herein are systems and techniques configured to extract semantic information based upon domain knowledge according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A semantic extraction system leverages domain expert knowledge, to impart meaningful business information aiding ordinary knowledge consumers in understanding large/complex data volumes and models thereof. Certain embodiments may comprise a layered structure comprising an information uplifting layer, a semantic processing layer, and a visual representation layer. Referencing domain knowledge model(s) created by human domain experts, the information uplifting layer extracts and maintains meaningful information in a semantic structure. The semantic processing layer then processes this extracted information for various different business analysis purposes. Finally, the visual representation layer allows the analyzed and aggregated information to be arranged and visualized via a range of interactive tools. The overall layered structure is powered by the domain knowledge models, which capture specialized knowledge from experts in different domains. Such domains can include industry and enterprise characteristics, data visualization, and model structure and function.

Embodiments may provide a mapping from data type in a database, to classes in a knowledge model. This can allow unifying different data types and also bridging data types with logical concepts in a knowledge base.

Figure 1:
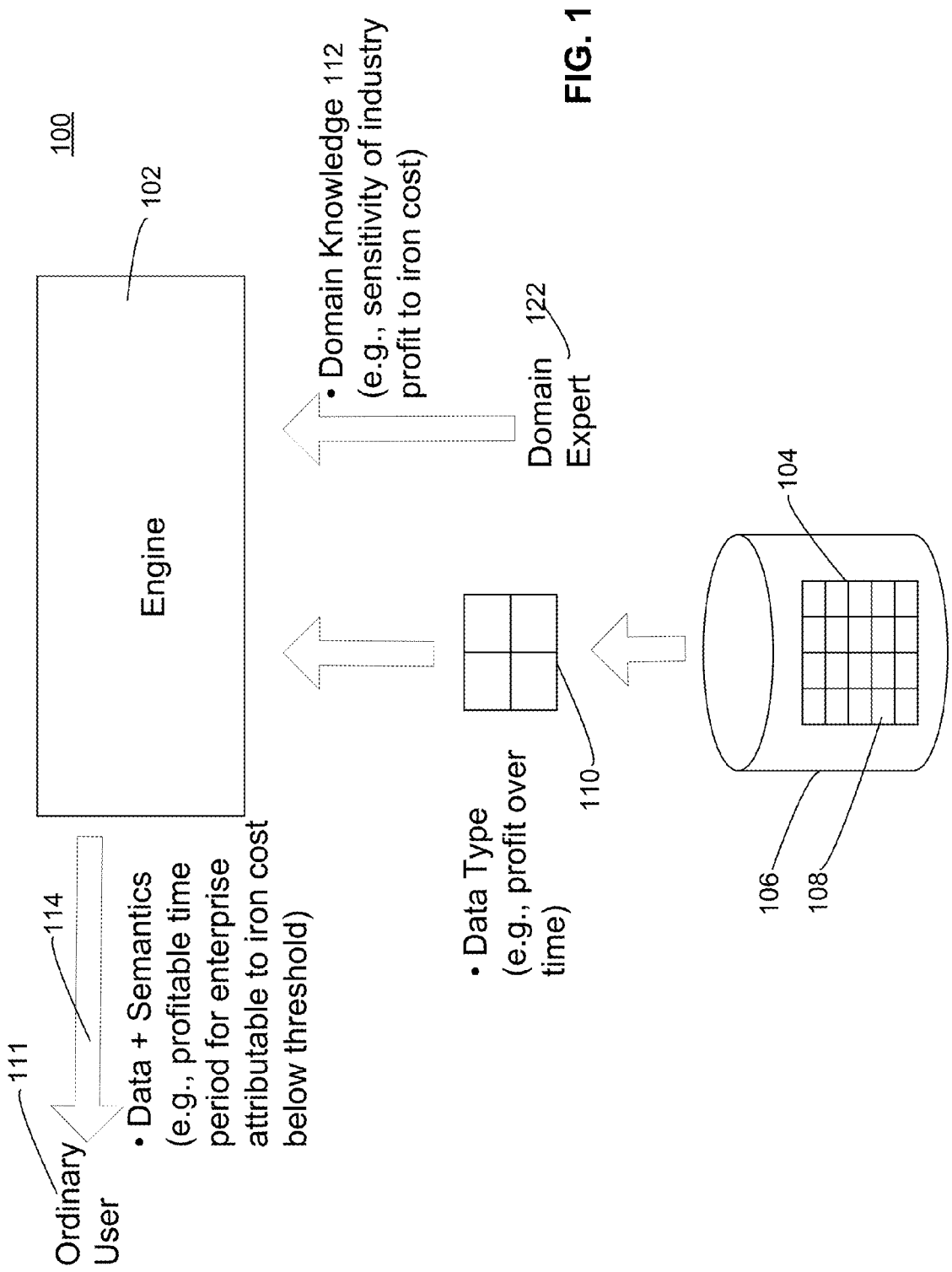
FIG. 1 is a simplified view illustrating a system configured to perform semantic extraction according to one embodiment.

FIG. 1 shows a simplified view of an embodiment of a system configured to perform semantic extraction according to an embodiment. In particular, the system 100 comprises an engine 102 that is in communication with an underlying database 104 present in a non-transitory computer readable storage medium 106.

The database 104 may be configured to store data in relatively simple form, for example individual fields 108 that are arranged in rows and columns. An example of such a data field might be the market price for iron.

Database 104, however, may also be configured to store relatively more complex data type 110. Such data types may comprise a plurality of basic data fields organized according to some semantic principle.

In one possible example, the data type might comprise metric reflecting a profit of an enterprise, that is attributable to the cost of iron. Such a data type could be important in assessing the financial performance of a particular business entity whose product features iron as a major cost component.

The semantic underpinnings of the relationship between enterprise profit and iron cost that is reflected in this data type, may be subtle and complex. In fact, such relationships may be evident only to one having expertise in one (or even multiple domains).

One example of such a domain could be financial in nature, such as specific knowledge regarding the particular structure of the enterprise (e.g., how big a part of the business of the enterprise, is attributable to the iron-containing product). Another example of such domain could be more technical in nature (e.g., how the iron is specifically utilized/consumed in the particular process of manufacturing the product).

The complex data type is created by experts in order to reflect this specialized domain knowledge. The complex data type is also reusable for other data sources, so an expert need not recreate it for other applications.

The semantics underlying this complex data type, however, may lie beyond the scope of knowledge of the ordinary knowledge consumer 111 who is seeking to access and manipulate the data type. Thus an ordinary member of the accounting department, may be unlikely to possess specialized domain knowledge reflecting the structure and function of the data type.

Accordingly, the engine is configured to receive not only the data type 110, but also specialized domain knowledge 112 provided from a domain expert 122. As discussed in detail below, this specialized domain knowledge may be provided to the engine in the form of one or more models.

The engine is configured to process these inputs 110 and 112, and then to provide output 114 in the form of data reflecting the underlying semantics of that data. Thus in the simple example presented above, the semantics output by the engine could provide an intermediate metric that aids an ordinary user in understanding/recognizing the contribution of iron cost to overall enterprise profit. An example of such a metric could be a time period reflecting a cost of iron below a given threshold. Such a threshold cost could be provided to the engine as part of the knowledge provided by the domain expert.

Figure 2:
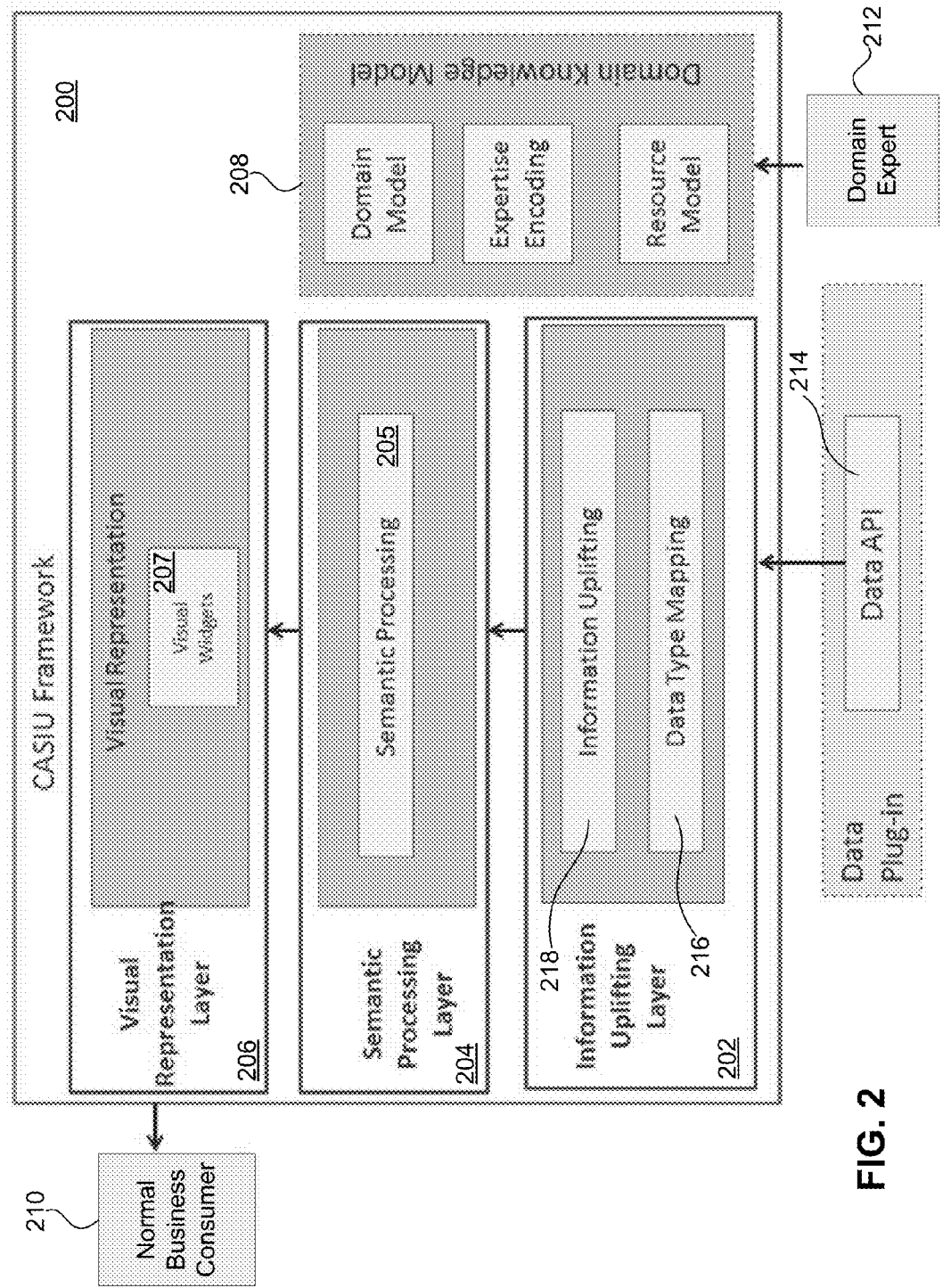
FIG. 2 is a simplified view illustrating steps of an embodiment of a method of semantic extraction according to an embodiment.

FIG. 2 shows a more detailed view of an embodiment of a system 200 that is configured to perform such semantic extraction. This system is designed to leverage domain expert knowledge, in order to allow semantic uplifting of meaningful business information to support business consumers in understanding large and complex data sets.

System 200 comprises a layered structure, including an information uplifting layer 202, a semantic processing layer 204, and a visual representation layer 206. Driven by the domain expertise offered by the domain knowledge model 208, the information uplifting layer 202 uplifts the meaningful information and maintains that knowledge within a semantic structure. Features of the information uplifting layer are described in detail below in connection with FIGS. 5A-5E.

The uplifted information is then subjected to semantic processing 205 in the semantic processing layer 204 for different business analysis purposes. The semantic processing layer is shown and discussed in detail later below.

Finally, the visual representation layer 206 allows analyzed and aggregated information to be arranged and visualized via a range of interactive visual widgets 207. This analyzed and aggregated information is then communicated to an ordinary business consumer 210 in a manner affording insight into the domain-specific nature of that data.

The layered structure of the system 200 of FIG. 2, is powered by the domain knowledge models 208. These models capture domain expertise from individual expert(s) 212, and express that expertise in the form of different models.

One such model is the resource model. Another model is shown as expertise encoding. Still another model is the domain model. Further details regarding the domain expert knowledge model are provided further below in connection with FIG. 4.

Figure 3:
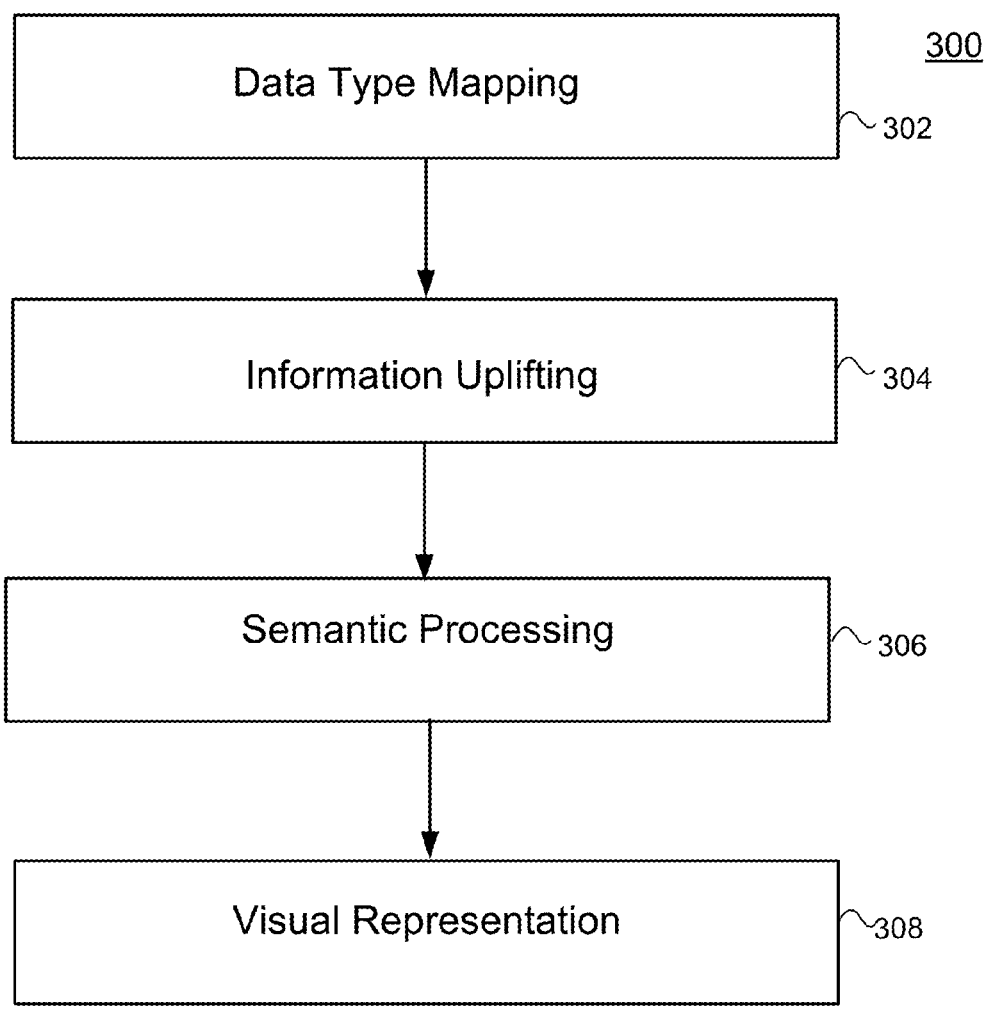
FIG. 3 is a simplified view illustrating a multi-layered system configured to perform semantic extraction according to an embodiment.

FIG. 3 shows a simplified flow diagram summarizing a method 300 according to an embodiment. A first step 302 comprises performing data type mapping. A second step 304 comprises performing information uplift. A third step 306 comprises performing semantic processing, and a fourth step 308 comprises visual representation of the extracted semantic data. Additional information regarding each of these steps is now provided below.

Specifically, returning FIG. 2 the components of the multi-layer structure are discussed in detail. In particular, FIG. 4 describes the domain expert knowledge model that provides the specialized expertise of the domain expert for purposes of semantic uplift.

Domain Expert Knowledge Model

The domain expert knowledge model 400 acts as a bridge between raw data, expert insights, and visualization of information in a manner that is meaningful for ordinary knowledge consumers. Rather than providing a single, overarching knowledge model, the domain expert knowledge model is a meta-model affording integration of multiple domain specific models (e.g., as may arise for an individual business scenario). In essence, the domain expert knowledge model defines a framework for linking insights of human experts on these models or systems, with system artifacts such as business data or business objectives.

The domain expert knowledge model also allows expert(s) to encode specialized knowledge regarding business states, behaviors, and events/potential problems. Such upper model concepts can then be employed to span multiple models in different business domains.

Figure 4:
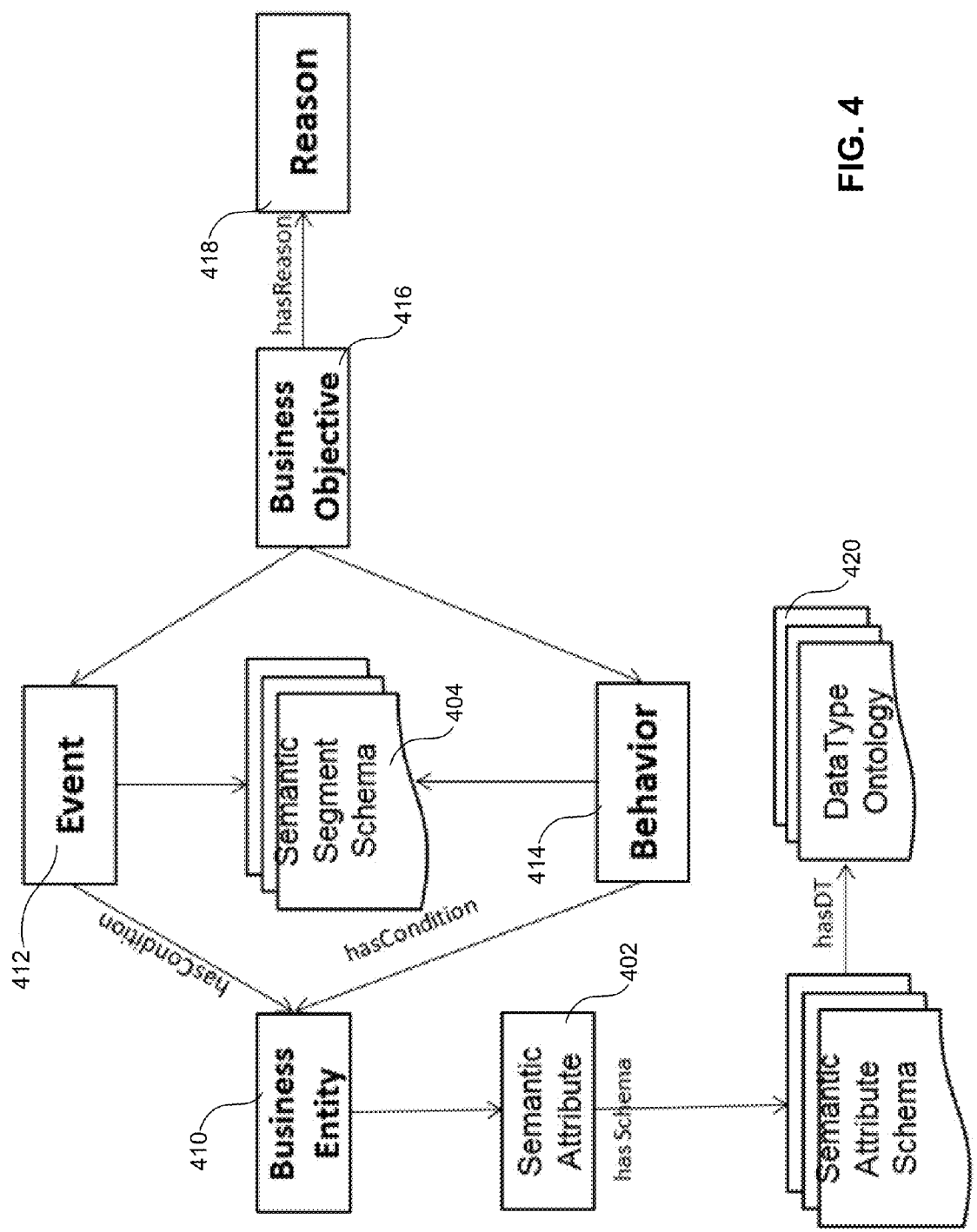
FIG. 4 is a simplified view illustrating a domain expert knowledge model.

In the domain expert knowledge meta-model 400 of FIG. 4, the semantic attribute 402 and the semantic segment 404 comprise two concepts used to provide efficient processing and combination of domain expert insights based on heterogeneous data inputs.

Specifically, semantic attributes are used to annotate raw data from heterogeneous data inputs. Semantic attributes thus support heterogeneous data collection.

As an example, a domain expert can define multiple sources of evidence in a business scenario as equivalent. Thus evidence of low effective performance may be provided via semantics from multiple Key Performance Indicators (KPIs).

Once annotated, these semantics can be treated equivalently by the ontology-level semantic reasoning. This bridges the gap between raw log data and the formal domain expert knowledge model.

Semantic attributes can be encoded in resource description framework knowledge models. These resource description framework knowledge models encapsulate an expert's subjective insights into the domain knowledge model. The resource models may comprise:

a concept definition;
a set of constraints; and
links to both the raw log data or metrics and a specialized knowledge model for the resources.

For example the semantic attribute "iron_material_cost_high" could be defined as occurring when a "high" cost of metal material is recoded in a specific type of data inputs. In particular, "high" is defined by the expert-specified constraint "more than 300 ton". The semantic attribute also links to the "iron_material_cost" and even the "metal_material_cost" concept in a detailed cost metrics knowledge model.

The semantic segments 404 of FIG. 4 are used in the meta-model to represent a combination of semantic attributes, domain ontology classes 420, and corresponding logic. The semantic segments capture business state transitions, business behavior, or problem detection.

Such logic represented by semantic segments, goes beyond the typical use of structured knowledge (ontologies). The semantic segments allow generic rules or temporal logic to be combined with traditional semantic technologies.

This combination provides an abstracted description about logical rules and conditions for semantic entities, assisting an average user in visualizing and understanding these rules and conditions. Typically, these logical rules and conditions are automatically decomposed into atomic SWRL rules and SPARQL queries in the semantic processing layer.

The domain expert knowledge model can also provide Web Ontology Language (OWL) classes to support potential business objectives and potential problem identification, diagnosis, and analysis. Examples of such classes in FIG. 4 include: Business Entity 410, semantic entity (Event 412, Behavior 414), Business Objectives 416, and Reasons 418.

The Business Entity could be a definition of business object or category (e.g., metal_material). The semantic entity could be considered as the semantics attached to the Business Entity, that also could be a trigger for another semantic entity.

The Event class is used to describe the business status and transitions in state. The Behavior class indicates the behavior happening on/between Business Entities. An example could be "material_consuming between a product and material".

The Business Objective class is used to represent the objectives of business behaviors to which events or behaviors may be related. The Reason class is used to relate expert-defined reasons to a Business Objective of a given type.

Information Uplifting Layer

The information uplifting layer of FIG. 2 is now described. That layer provides a semantic uplift, consuming raw business data to transforming it into a common knowledge-based (semantic) model of the specific business purpose. This model is permitted by an expert-specified knowledge model of the business domain.

The availability of the input business data may be present in a semi- or fully structured form, that references representations of information from heterogeneous data resources. The data is consumed from multiple data inputs via API(s) 214 and used to feed the uplifting approach.

In this layer 202 of the structure 200, the information uplifting approach can be divided into two processes: Data Type Mapping 216 and Information Uplifting 218.

Figure 5A:
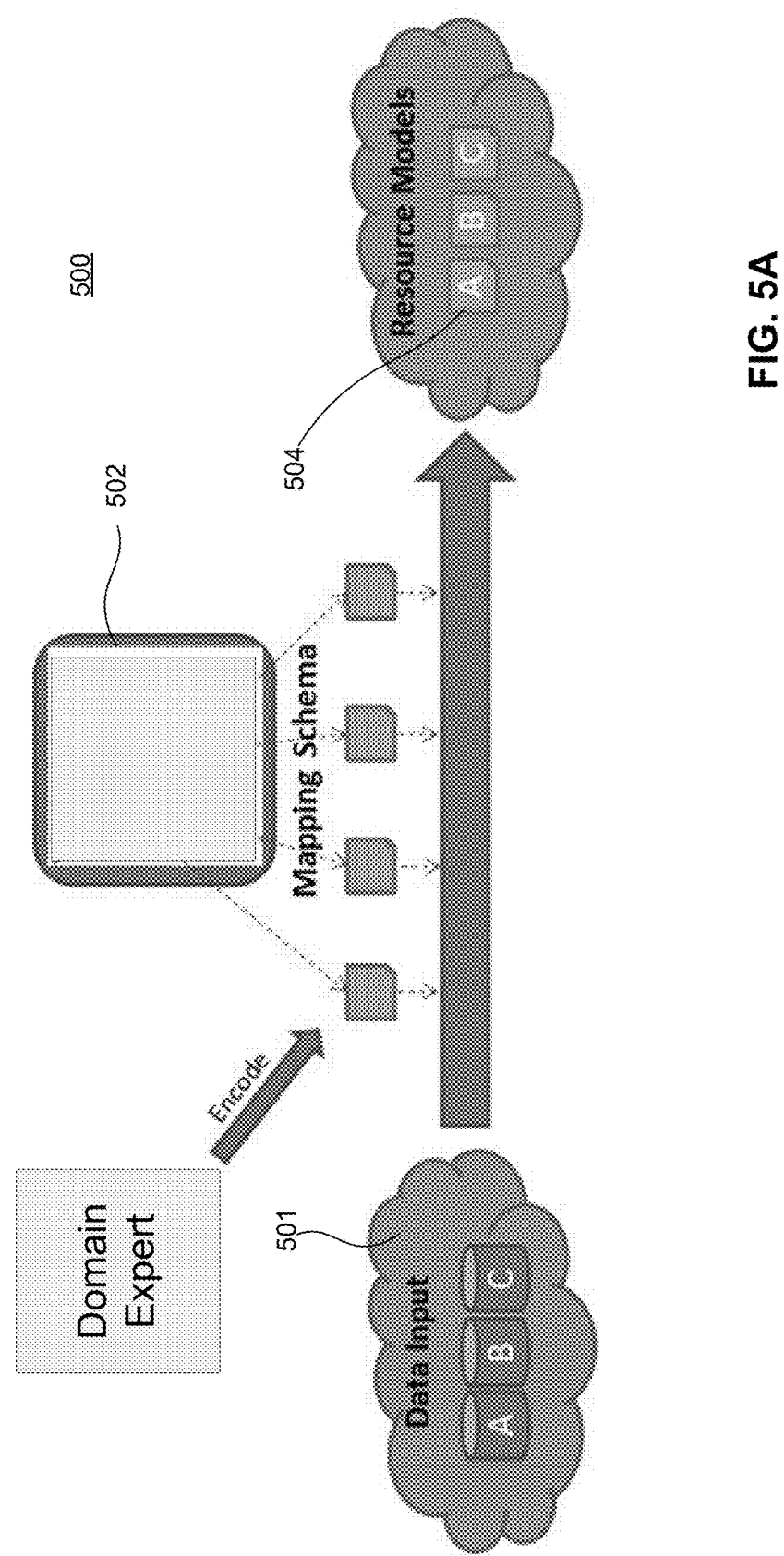
FIG. 5A is a simplified view illustrating a data type mapping process.

The design of Data Type Mapping is shown in FIG. 5A. The Data Type Mapping 500 maps the class in the domain expert knowledge model, to the entity in the heterogeneous input data 501.

This mapping process is allowed by a number of mapping schemas 502. The outputs of this approach are a set of resource models 504. This set refers to the domain knowledge model to make them understandable by the information uplift engine.

The components and models adapted by the Data Type Mapping approach are summarized in the Table 1 below.

| Name | Description | Representation |
|---|---|---|
| Data Input 501 | The data input formatted in heterogeneous metrics | CSV, XML, etc. |
| Mapping Schema 502 | The schema encoded by domain expert to map the element between data metrics and domain knowledge model | See Table 2 |
| Resource Model 504 | The model to represent the resources | See Table 3 |

Details regarding the data are now provided. The input data in the business intelligence environment may be highly heterogeneous. In particular, the data are generated by a number of diverse applications and services, and collected from various data repositories.

For example, the Business Warehouse (BW) system is a data repository available from SAP AG of Walldorf, Germany. In that system, the data is under a structure with different semantics (like the data cube with dimensions, characteristics, variables, etc.). As used herein, such entities in the data input are called data type elements.

The mapping schema 502 is a component employed in the mapping process. The mapping schema is used to indicate the relationship between a data type element and the data type class in the cross-domain knowledge model. Then, the resource models are generated according to this relationship mapping.

By consuming the generated resource models, embodiments can understand the meaning of the input data, and then trigger suitable rules or invoke the corresponding knowledge model for the information uplifting on that input data. When new types of data input arrive or new metrics are updated, this mapping schema can be encoded or adjusted by a domain expert.

Table 2 below provides a summary of components in a data type mapping schema.

| Name | Description | Representation |
|---|---|---|
| Resource Type | The type of resource which generates the input data | Sub-classes of Resource class |
| Resource Format | The format of data from resource | Data cube, table, etc. |
| Element Name | The name of the element in the input data | Sub-classes of DataType class |
| Data Type Mapping | The element mapped to the data metrics | data element in the data source, etc. |
| Knowledge Mapping | The URI of the class in knowledge model | The URI of OWL class |
| Description | The description of the element | The description formatted into the description element of this schema |

The Resource Model 504 is a semantic model aiming to provide a comprehensive representation for the information input from heterogeneous data sources. This model may be encoded in OWL with a set of ontology classes. A semantically modelled resource represented as RDF triples, may be maintained in the entity pool.

Table 3 below provides a summary of components in an InfoProvider Resource model.

| Name | Description | Representation |
|---|---|---|
| Resource Type | The type of resource which generates the input data | Sub-classes of Resource class |
| Resource ID | The unique id of data resource | Integer data associated with hasID data property |
| Data Type | The data types in the metrics of this resource | Sub-classes of DataType class |
| Annotated Entity | The id of the semantic entity annotated to this resource | Integer data associated with hasID data property |
| Description | The description of the resource | The description formatted into the description element of this schema |

Figure 5B:
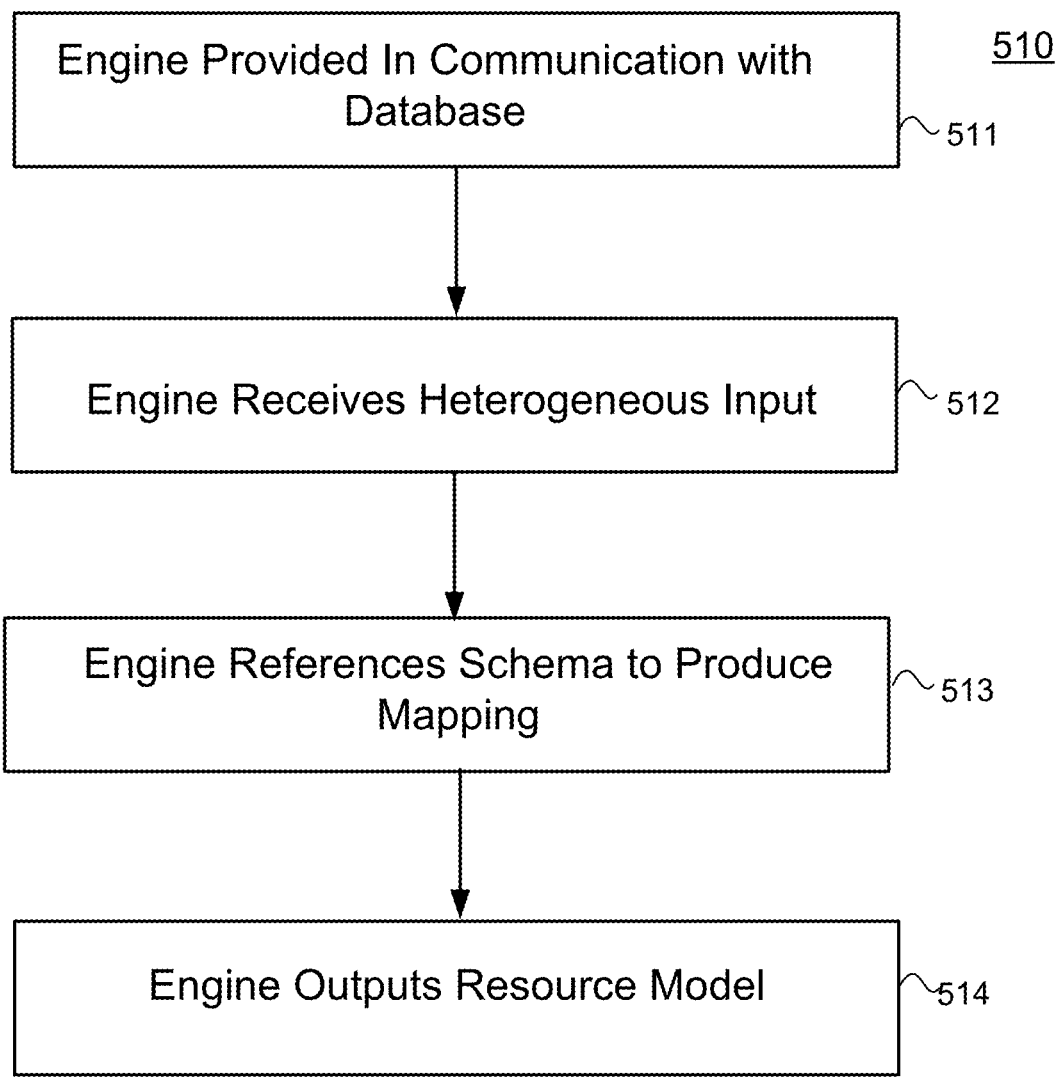
FIG. 5B is a simplified flow diagram illustrating an embodiment of a data type mapping process according to an embodiment.

FIG. 5B is a simplified flow diagram showing steps of a method 510 of performing data type mapping according to an embodiment. Specifically, a first step 511 comprises providing an engine in communication with a database configured to store a data type. In a second step 512 the engine is caused to receive a heterogeneous input comprising an element. In a third step 513 the engine is caused to reference a schema of a knowledge model created by a domain expert, to produce a mapping of the element with a class of the mapping schema. In a fourth step 514, the engine is caused to output a resource model comprising the mapping and a relationship between the element and the data type.

Figure 5C:
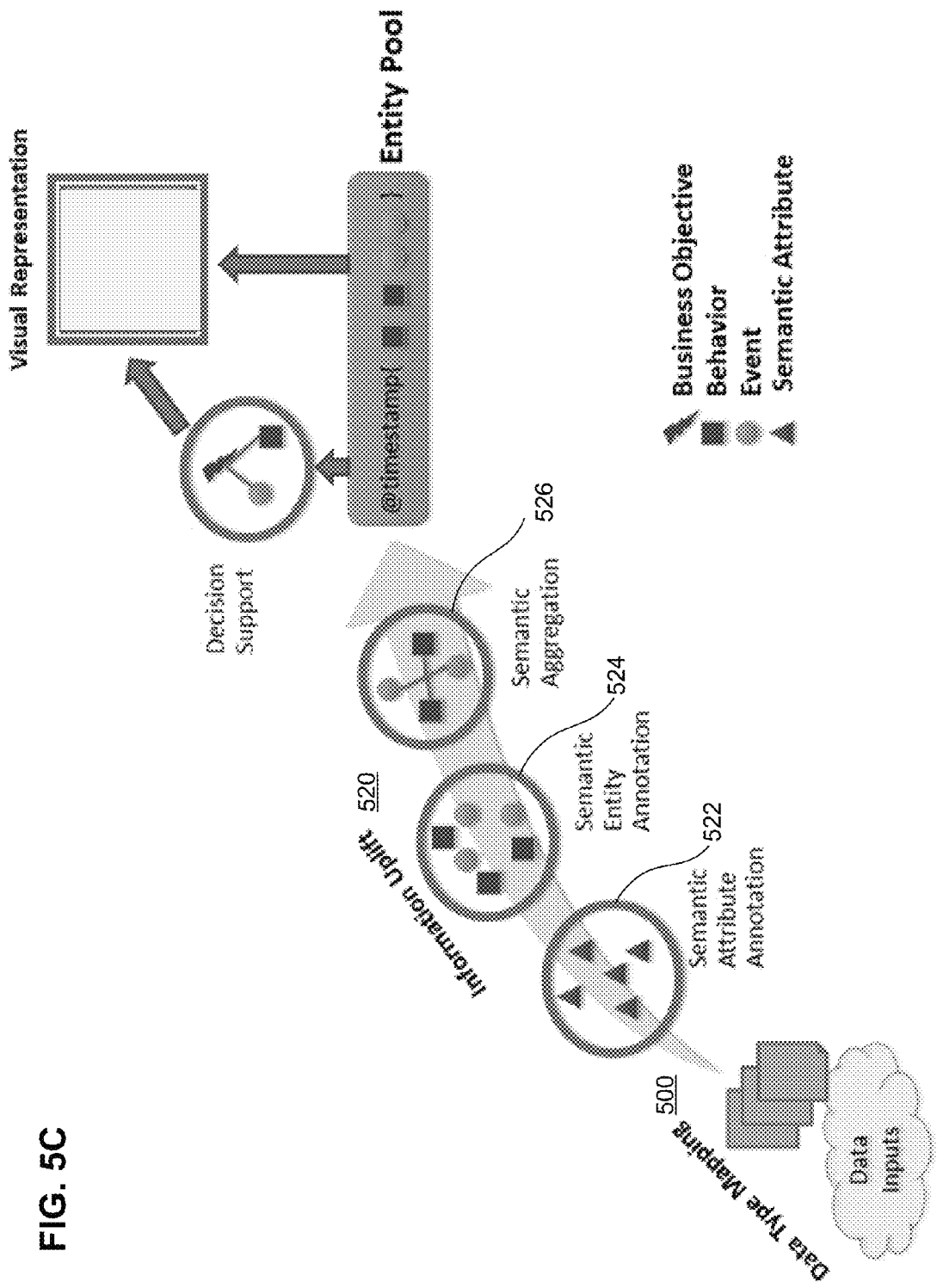
FIG. 5C is a simplified view illustrating an information uplifting process.

Details regarding the design of the Information Uplifting Process of FIG. 2, are now provided in connection with FIG. 5C. This information uplifting approach enriches information by endowing domain-specified semantic meaningful concepts, with the captured characteristics of identified data inputs. The information uplifting models the uplifted information in appropriate representation, which also references to the domain expert knowledge model.

As shown in FIG. 5C, this information uplift process 520 is divided into three steps: semantic attribute annotation 522, semantic entity annotation 524, and semantic aggregation 526.

The semantic attribute annotation process aims to extract meaningful information from modelled data inputs. This data is fed into the semantic attribute annotation process based on highly heterogeneous metrics.

However, the data types (e.g., revenue, cost, etc.) of metrics are aggregated and mapped to corresponding data type elements in the knowledge model. Hence related semantic attributes can be applied to the same data type to simplify the annotation process.

This semantic attribute annotation process supports diverse information extraction and annotation patterns for semantic attributes. As discussed above in connection with the domain knowledge model of FIG. 4, semantic attributes are pieces of semantic encodings captured from domain experts.

Pattern detection algorithms have been applied to aggregate and detect data value changes that capture the characteristics of the data stream. This is accomplished by dividing the data into discrete intervals of moderately varying behavior or time-stamped change points where there are abrupt changes of the steady state metric values. The appropriate semantic attributes are associated with these characteristics in the raw data metrics.

Figure 5D:
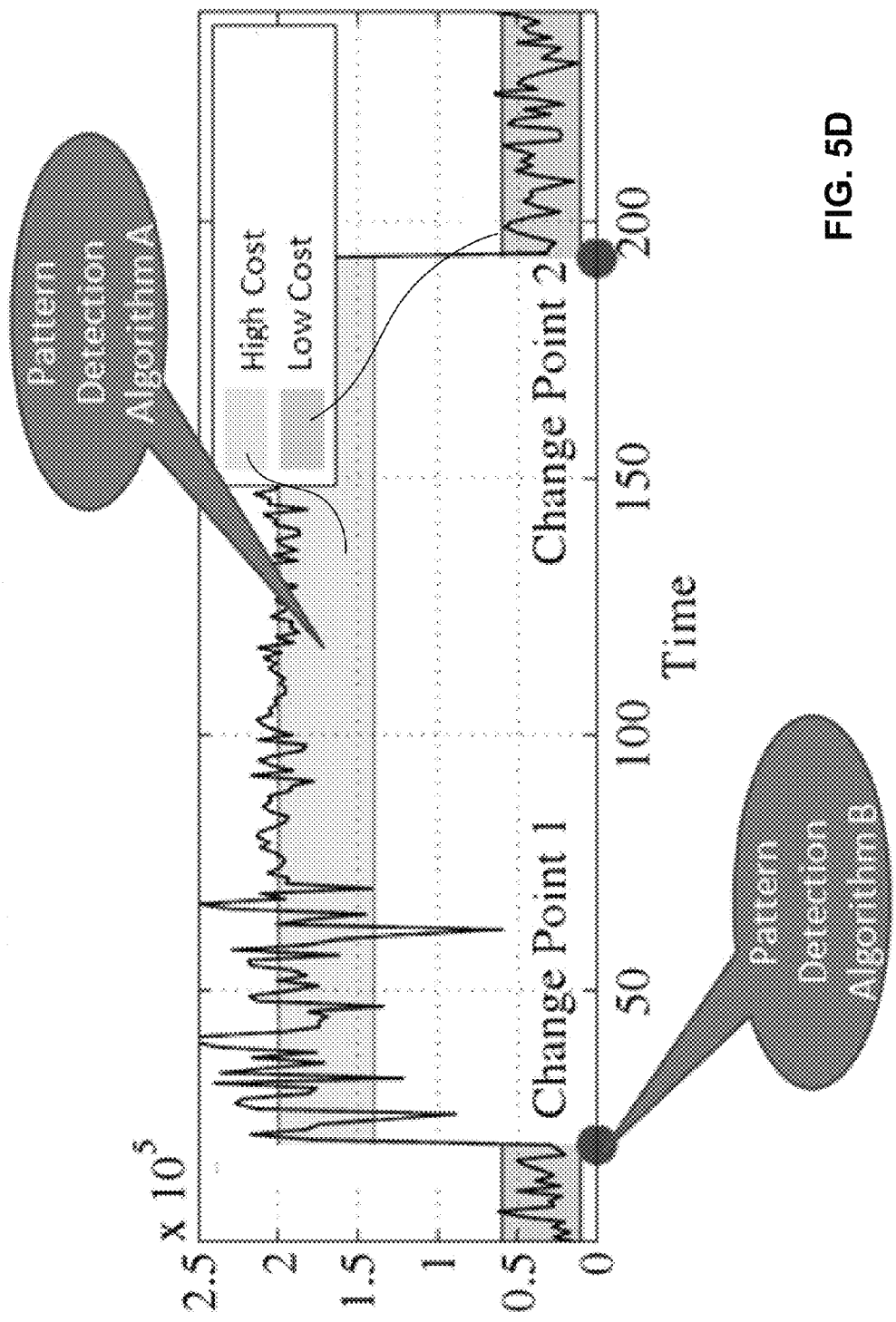
FIG. 5D is a simplified view illustrating one example of the application of pattern detection algorithms to data input.

Information extraction techniques are applied to capture the characteristics of the stream data. FIG. 5D shows one example of pattern detection algorithms applied on the data input.

Specifically, in a given data interval the pattern detection algorithm A is applied to detect the changes of the steady state metric values. This algorithm A also divides the data stream into discrete partitions and points.

Another pattern detection algorithm B aggregates the data value and captures the characteristics in each discrete partition. Then these captured characteristics are annotated with semantic attributes like "material_cost_high" and "material_cost_low".

Pursuant to the expert-defined semantic attribute schema, the information is extracted by annotating characteristics of data stream and modelled into corresponding semantic attributes. According to the captured characteristics, there are at least the following two types of the real-time annotation process to generate the annotated semantic attribute stream (P) with corresponding stamps: discrete annotation, and continuous annotation.

The discrete annotation process is the real-time discrete point annotation (like change point in the data stream), which could be considered as a sequence of semantic meaning points (S) annotated as a semantic attribute stream (P), i.e. P={$S_1 \ldots, S_m$}, where $S_i$=(s,t) is a pair with the semantic meaning (s) at stamp t.

The continuous annotation process is used to annotate a piece of data with corresponding meanings, which annotates the data status (S) to data intervals, i.e. P={$S_1 \ldots, S_m$}, where $S_i$=(s,$t_1$,$t_2$) is a triple with the data status (s) in a data interval ($t_1$,$t_2$).

The annotated semantic attribute streams are maintained for the further extraction of the meaningful information, which allows another annotation process—the semantic entity annotation 524 of FIG. 5C.

In the semantic entity annotation process, the semantic attributes describing data elements are linked to higher-level semantic entities (like events and behaviors) in the domain defined by domain experts. This permits a dynamic picture of the data inputs to be built up from the annotated semantic attribute stream, allowing features such as the business status changes to be available in a meaningful way for visual representation to normal users.

Through these information extraction and annotation patterns, semantically meaningful information is extracted from raw data. According to annotated semantic attributes, related entities in the domain knowledge model are checked one-by-one in an event diagnosis loop. The information is iteratively annotated with events from low-level to high-level.

This checking can be based on the rule encoded by domain expert in the semantic entity schema. For example a particular semantic attribute could be considered as a low-level annotation. If there is another entity whose condition is based on this initial annotation, this can refer to higher-level events, and so events are annotated level-by-level.

Annotated events are maintained in an entity pool. In the semantic entity annotation process, the entity pool checks the semantic annotation loop until there are no more new events (and no rules to fire). At such time, uplifting of the data in this data interval is finished. The semantic entities in the entity pool are then maintained for use in other approaches.

At least the following two types of annotation processes may be used for this pattern-driven annotation stream (P): high-level meaning annotation, and behavior annotation.

The high-level meaning annotation process aims to annotate the high-level event (S) onto the low-level semantic attribute stream. The high-level semantic meaning(s) with the corresponding low-level semantic meanings ($s_1 \ldots, s_n$) are determined according to the expert encoded semantic segments, i.e. P={$S_1 \ldots, S_m$}, where $S_i$=(s,{$s_1 \ldots, s_n$}).

The behavior annotation process annotates the behavior (b) onto the raw data stream, which is based on semantic segment of behavior events (S). That is, P={$S_1 \ldots, S_m$}, where $S_i$=(b,$t_1$,$t_2$) is a triple with the behavior (b) happened in a data interval ($t_1$,$t_2$).

The semantic aggregation process 526 of the uplifting layer is now discussed. In the information uplifting approach, the semantic entities are uplifted and modelled based on particular data inputs.

Figure 5E:
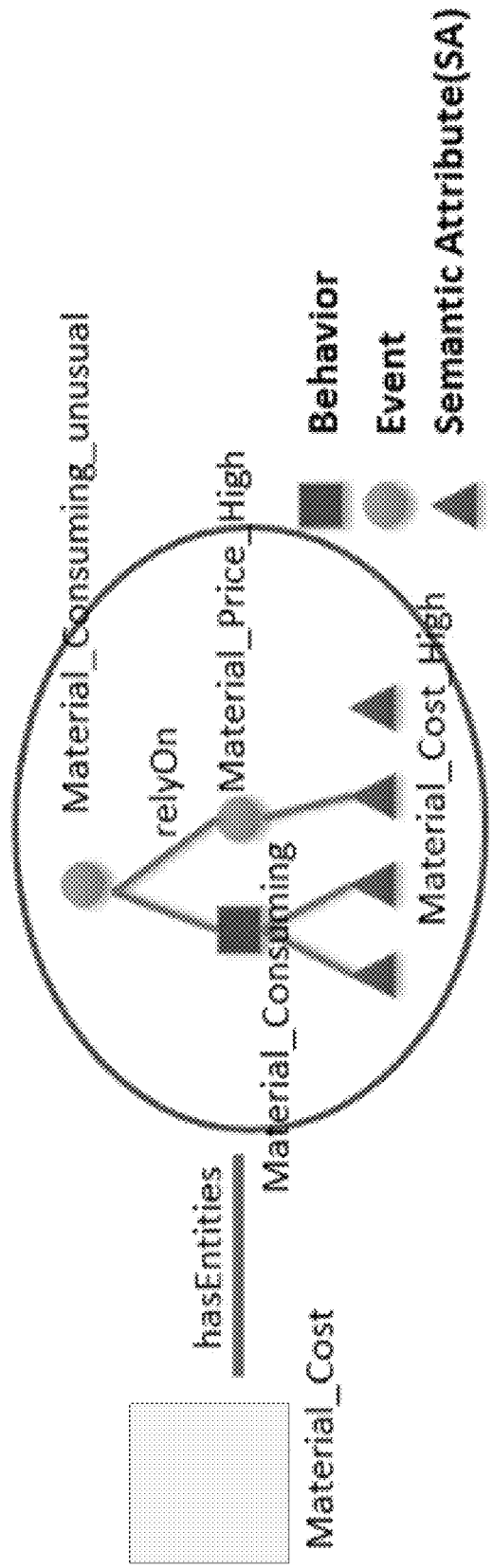
FIG. 5E is a simplified view illustrating a semantic aggregation process.

FIG. 5E shows a simplified view of a further information uplift that is performed—the semantic aggregation process. The semantic aggregation process reviews the entities extracted from different domains currently in the entity pool, to ensure that these entities include references to appropriate higher-level entities.

Semantic Processing Layer

The semantic processing layer of FIG. 2 is now discussed. In this semantic processing layer, the information uplifted from lower layers undergoes further knowledge-driven aggregation, diagnosis, and analysis.

The further processing of uplifted information in the semantic processing layer, may take place in response to user interactions with the visual widgets (discussed below), or for deeper semantic analysis (for example to determine to support multi-level description of business object in an analytic view).

Annotated semantic entities may be maintained in an entity pool with an RDF triple structure. Such a triple structure typically comprises object, subject, and properties.

Semantic entities from heterogeneous resources are linked to raw data inputs, to allow further display, post-processing, or analysis of the data if desirable. As shown in FIG. 2, the semantic processing layer overlies the information uplifting layer.

The entity aggregation process reviews the entities currently in the entity pool, to confirm they include references to appropriate higher-level entities.

Events may cause potential problems in business objectives. If a problem is detected, then a root-cause analysis process is to be applied to it. For example, a revenue degradation problem is defined as potentially caused by a "high_cost" status for some business department.

Results of the semantic aggregation, diagnosis, and analysis are represented in a display-independent schema for consumption by the visual representation layer (discussed below). Thus a wide range of widgets can be developed to provide human-centric visual arrangements.

The semantic processing approach allows drill-down analysis across the business domain to support the higher-level business objectives for normal business users. Semantic entities uplifted and modelled from heterogeneous input data are linked to facilitate semantic analysis according to a business objective if desired. Thus, this semantic processing approach may be executed in two steps: problem diagnosis, and problem analysis.

The problem diagnosis process detects and indicates a problem happened among the current uplifted semantic entities. Events that may cause potential problems in business domain are labelled as a problem. The problem diagnosis process is knowledge-driven, relying on the cross-domain knowledge model to permit semantic reasoning across the semantic entities in different business domains.

The problem analysis process adopts a drill-down analysis across the knowledge domains, to determine the root-cause reason. It models the analysis process step-by-step, in order to support non-expert users in understanding problems for business objective.

If a problem is detected in the problem diagnosis process, then a root-cause analysis process is applied to it. The aggregation, diagnosis, and analysis result is also semantically modeled to represent what is happening, what will happen, what caused the problem, and the available solutions.

Visual Representation Layer

The results of the semantic aggregation, diagnosis and analysis are represented in a display-independent schema for consumption by the visual representation. Thus a wide range of widgets can be developed to enable human-centric visual arrangements.

In the visual representation layer, user interface (UI) widgets are adaptable for the normal users to understand the uplifted information through the communication middleware. The information received from the semantic processing layer, is independent of any particular visualization widget.

Thus, the visualization layer can embed additional expertise-driven logic to select or personalize the most appropriate presentation widget for a given combination of information and user. This process is called information arrangement.

This separation of domain-specific expertise from visualization-specific expertise, improves on conventional approaches that embed domain reasoning and associated domain-level assumptions, in the presentation layer.

In particular, the aggregated and uplifted information from the semantic processing layer is arranged into the appropriate information model for different visual views. This model depends on the type of widget. This process is considered as the visual arrangement process.

The visual representation layer provides a number of widgets that expose views and manipulators for the semantic model of the information. These widgets aim to support the requirements of non-expert users monitoring and troubleshooting. This allows them to understand, reason about, and to make business user administration decisions by themselves.

In this manner, a holistic yet abstracted view of the business information can be presented. This simplified view contains visual representations of user selected business information. It also acts as an entry point to obtain additional context information, and drill down into event details and root-cause and solution analysis based on domain expert knowledge. A specialized set of widgets may allow for the collection of expert knowledge in order to populate the domain expert knowledge model.

Embodiments of systems and methods of semantic extraction may offer one or more benefits. For example, particular embodiments may be compatible with heterogeneous existing data sources and BI systems offered by particular platforms, for example those of SAP AG.

Embodiments may also provide high extensibility by expanding the domain knowledge base. This allows for effective utilization of domain expertise in different business domains.

Embodiments may offer analytic models tailored for particular BI systems, and allow knowledge-driven reasoning. As a result, the information generated by such systems is more meaningful for business analysis in BI systems.

Figure 6:
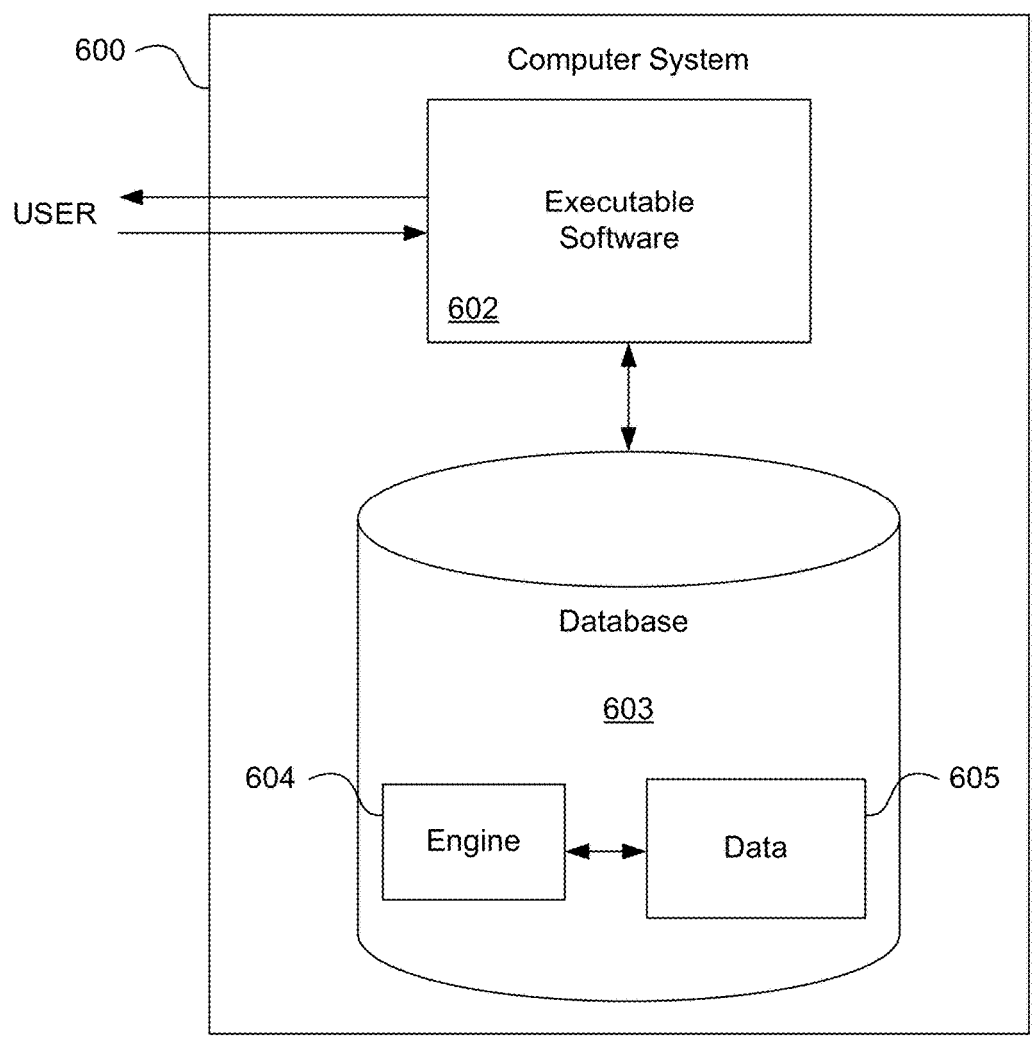
FIG. 6 illustrates hardware of a special purpose computing machine configured to implement semantic extraction according to an embodiment.

FIG. 6 illustrates hardware of a special purpose computing machine configured to perform semantic extraction according to an embodiment. In particular, computer system 600 comprises a processor 602 that is in electronic communication with a non-transitory computer-readable storage medium 603. This computer-readable storage medium has stored thereon code 605 corresponding to data. Code 604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
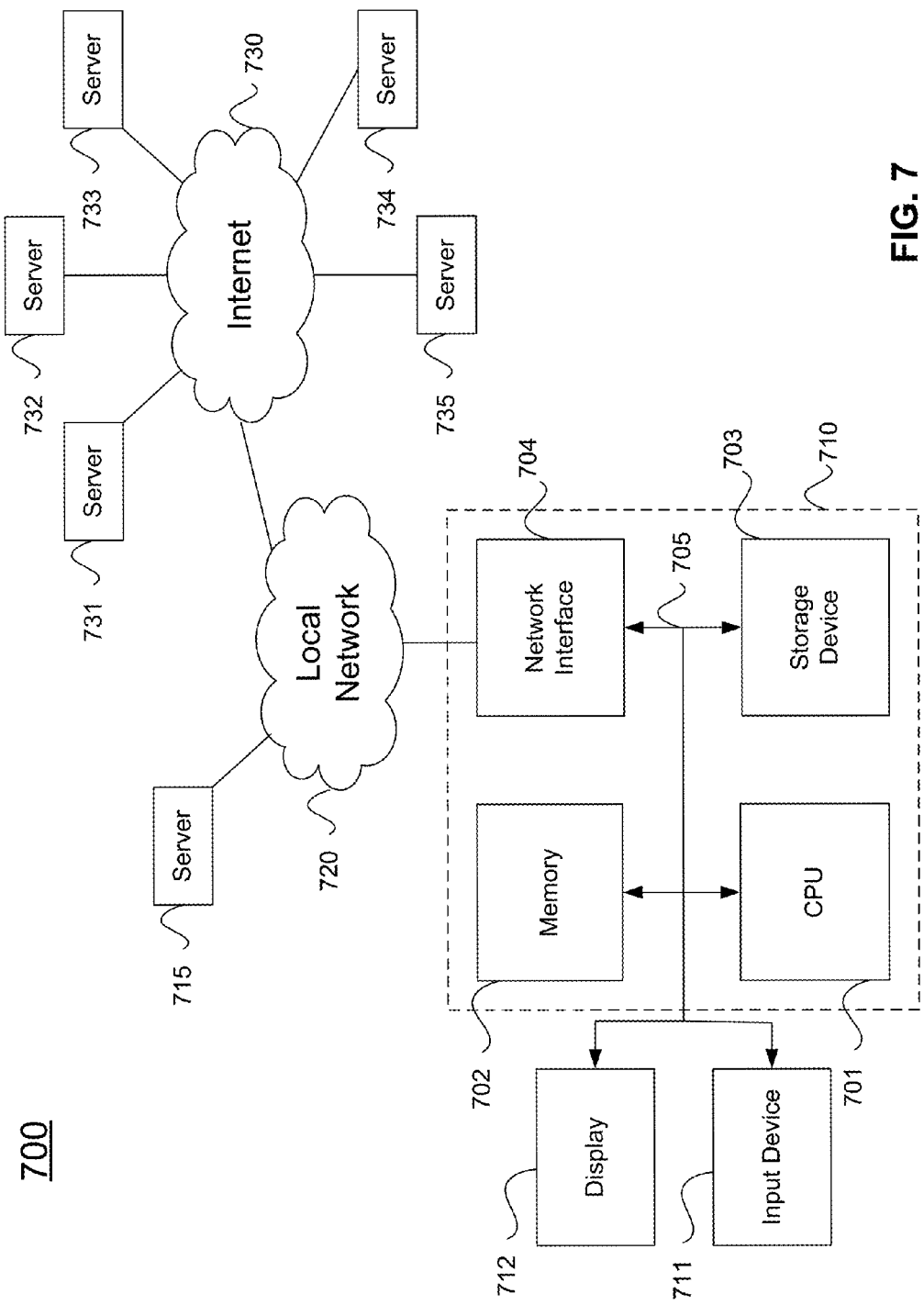
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
   providing an engine in communication with a database configured to store a data type;
   causing the engine to receive a heterogeneous input data stream comprising an element;
   causing the engine to reference a mapping schema of a knowledge model created by a domain expert, to produce a mapping of the element with a class of the mapping schema;
   causing the engine to output a resource model comprising the mapping and a relationship between the element and the data type;
   causing the engine to apply a first pattern recognition to partition the data stream into a segment including a data interval;
   causing the engine to apply a second pattern recognition to determine a data value change in the segment;
   causing the engine to apply an attribute schema of the resource model to the segment to identify an event;
   causing the engine to apply a segment schema of the resource model to the data stream to generate a pattern-driven annotation stream comprising a triple in a form of $(b,t_1,t_2)$, where b comprises a behavior and $t_1$ and $t_2$ indicate the data interval; and
   maintaining the event and the behavior in an entity pool.

2. A method as in claim 1 wherein the resource model further comprises a written description of the element.

3. A method as in claim 1 wherein the mapping schema identifies a format of the data type.

4. A method as in claim 1 wherein the class is encoded in web ontology language (OWL).

5. A non-transitory computer readable storage medium embodying a computer program for performing a method, said method comprising:
   providing an engine in communication with a database configured to store a data type;
   causing the engine to receive a heterogeneous input data stream comprising an element;
   causing the engine to reference a mapping schema of a knowledge model created by a domain expert, to produce a mapping of the element with a class of the mapping schema;
   causing the engine to output a resource model comprising the mapping and a relationship between the element and the data type;
   causing the engine to apply a first pattern recognition to partition the data stream into a segment including a data interval;
   causing the engine to apply a second pattern recognition to determine a data value change in the segment;
   causing the engine to apply an attribute schema of the resource model to the segment to identify an event;
   causing the engine to apply a segment schema of the resource model to the data stream to generate a pattern-driven annotation stream comprising a triple in a form of $(b,t_1,t_2)$, where b comprises a behavior and $t_1$ and $t_2$ indicate the data interval; and
   maintaining the event and the behavior in an entity pool.

6. A non-transitory computer readable storage medium as in claim 5 wherein the resource model further comprises a written description of the element.

7. A non-transitory computer readable storage medium as in claim 5 wherein the mapping schema identifies a format of the data type.

8. A non-transitory computer readable storage medium as in claim 5 wherein the class is encoded in web ontology language (OWL).

9. A computer system comprising:
   one or more processors;
   a software program, executable on said computer system, the software program configured to:
   provide an engine in communication with a database configured to store a data type;
   cause the engine to receive a heterogeneous input data stream comprising an element;
   cause the engine to reference a mapping schema of a knowledge model created by a domain expert, to produce a mapping of the element with a class of the mapping schema;
   cause the engine to output a resource model comprising the mapping and a relationship between the element and the data type;
   cause the engine to apply a first pattern recognition to partition the data stream into a segment including a data interval;
   cause the engine to apply a second pattern recognition to determine a data value change in the segment;
   cause the engine to apply an attribute schema of the resource model to the segment to identify an event;
   cause the engine to apply a segment schema of the resource model to the data stream to generate a pattern-driven annotation stream comprising a triple in a form of $(b,t_1,t_2)$, where b comprises a behavior and $t_1$ and $t_2$ indicate the data interval; and
   maintain the event and the behavior in an entity pool.

10. A computer system as in claim 9 wherein the resource model further comprises a written description of the element.

11. A computer system as in claim 9 wherein the schema identifies a format of the data type.

* * * * *